(12) United States Patent
Singh

(10) Patent No.: US 10,872,707 B2
(45) Date of Patent: Dec. 22, 2020

(54) NUCLEAR WASTE STORAGE CANISTERS

(71) Applicant: Holtec International, Marlton, NJ (US)

(72) Inventor: Krishna P. Singh, Hobe Sound, FL (US)

(73) Assignee: Holtec International

( * ) Notice: Subject to any disclaimer, the term of this patent is extended or adjusted under 35 U.S.C. 154(b) by 996 days.

(21) Appl. No.: 15/294,896

(22) Filed: Oct. 17, 2016

(65) Prior Publication Data

US 2017/0110210 A1    Apr. 20, 2017

Related U.S. Application Data

(60) Provisional application No. 62/242,458, filed on Oct. 16, 2015.

(51) Int. Cl.
  *G21F 5/12* (2006.01)
  *G21F 5/008* (2006.01)
  *G21F 5/10* (2006.01)

(52) U.S. Cl.
  CPC ............... *G21F 5/12* (2013.01); *G21F 5/008* (2013.01); *G21F 5/10* (2013.01)

(58) Field of Classification Search
  CPC ............... G21F 5/12; G21F 5/008; G21F 5/10
  See application file for complete search history.

(56) References Cited

U.S. PATENT DOCUMENTS

| | | |
|---|---|---|
| 3,425,308 A | 2/1969 | Krainer et al. |
| 3,425,380 A * | 2/1969 | Krainer ............... G21C 13/087 220/586 |
| 4,274,007 A * | 6/1981 | Baatz ............... G21F 5/12 250/506.1 |
| 5,102,615 A | 4/1992 | Grande et al. |
| 5,546,436 A | 8/1996 | Jones |
| 5,852,643 A | 12/1998 | Copson |
| 5,898,747 A | 4/1999 | Singh |
| 6,064,711 A | 5/2000 | Copson |
| 7,743,962 B2 | 6/2010 | Cocq et al. |

(Continued)

FOREIGN PATENT DOCUMENTS

JP    2003-207592 A1    7/2003

OTHER PUBLICATIONS

International Search Report and Written Opinion for priority application No. PCT/US2016/057273, dated Jun. 12, 2017.

(Continued)

*Primary Examiner* — Lily C Garner
(74) *Attorney, Agent, or Firm* — The Belles Group, P.C.

(57) ABSTRACT

A dry storage systems for radioactive nuclear waste materials in one embodiment includes a canister having a tubular shell defining an internal cavity for storing nuclear waste material, a lid sealably welded to one end the shell, and an end closure attached to a second end of the shell. The end closure includes a base plate having an upturned peripheral annular closure flange. In one embodiment, a circumferentially-extending butt joint is formed between the closure flange and the shell second end which is hermetically seals by a full through-wall thickness butt weld. Various embodiments may further include secondary pressure retention barriers enclosing the canister or select portions thereof most susceptible to failure under certain conditions.

15 Claims, 8 Drawing Sheets

(56) References Cited

U.S. PATENT DOCUMENTS

| | | | |
|---|---|---|---|
| 8,135,107 B2 | 3/2012 | Singh et al. | |
| 2007/0138234 A1* | 6/2007 | Waskey | B23K 15/0053 |
| | | | 228/101 |
| 2010/0133269 A1* | 6/2010 | Moricca | G21F 5/005 |
| | | | 220/200 |
| 2010/0272225 A1* | 10/2010 | Singh | G21F 5/10 |
| | | | 376/272 |
| 2012/0037632 A1 | 2/2012 | Singh et al. | |
| 2014/0077105 A1 | 3/2014 | Kawahara | |
| 2014/0219408 A1* | 8/2014 | Singh | G21F 5/008 |
| | | | 376/272 |
| 2014/0263073 A1* | 9/2014 | Barker | C02F 1/42 |
| | | | 210/668 |

OTHER PUBLICATIONS

European Supplemental Search Report for related application EP 16866818.4, dated Jun. 5, 2019.

\* cited by examiner

NUCLEAR WASTE STORAGE CANISTERS

CROSS-REFERENCE TO RELATED APPLICATIONS

The present application claims the benefit of priority to U.S. Provisional Application No. 62/242,458 filed Oct. 16, 2015, which is incorporated herein by reference in its entirety.

BACKGROUND

The present invention generally relates to dry storage systems for high level radioactive nuclear waste materials, and more particularly to a canister system for storing such materials.

In the operation of nuclear reactors such as those used in nuclear power generation plants, hollow Zircaloy tubes filled with enriched uranium, known as fuel assemblies, are burned up inside the nuclear reactor core to produce steam for the Rankine power generation cycle. It is necessary to remove these fuel assemblies from the reactor after their energy has been depleted to a predetermined level. Upon depletion and subsequent removal from the reactor, these spent nuclear fuel ("SNF") rods are still highly radioactive and produce considerable heat, requiring that great care be taken in their subsequent packaging, transporting, and storing. Specifically, the SNF emits extremely dangerous neutrons and gamma photons. It is imperative that these neutrons and gamma photons be contained at all times subsequent to removal from the reactor core.

In defueling a nuclear reactor, the SNF is removed from the reactor and placed under water, in what is generally known as a spent fuel pool or pond storage. The pool water facilitates cooling of the SNF and provides adequate radiation shielding. The SNF is stored in the pool for a period of time that allows the heat and radiation to decay to a sufficiently low level so that the SNF can be transported with safety. However, because of safety, space, and economic concerns, use of the pool alone is not satisfactory where the SNF needs to be stored for any considerable length of time. Thus, when long-term storage of SNF is required, it is standard practice in the nuclear industry to store the SNF in a dry state subsequent to a brief storage period in the spent fuel pool. Dry storage of SNF typically comprises storing the SNF in a dry inert gas atmosphere encased within a structure that provides adequate radiation shielding.

Maintaining confinement of radioactive material contents such as SNFs or other contaminated waste materials is a principal function of welded canisters used heretofore. One such canister, known as a multi-purpose canister ("MPC"), is described in U.S. Pat. No. 5,898,747, to Krishna P. Singh, issued Apr. 27, 1999, the entirety of which is hereby incorporated by reference. Typically, the SNF is loaded into an open canister that is submerged under water in a fuel pool. Once loaded with SNF, the canister is removed from the pool, placed in a staging area, dewatered, evacuated, dried, hermetically sealed, and transported to a long-term storage facility. The canister typically contains an internal basket comprising an array of cells for storing and supporting a plurality of SNF rods positioned within the cavity of the canister (see, e.g. U.S. Pat. No. 5,898,747).

In its standard form, the confinement boundary of the canister consists of a thick base plate welded to a relatively thin walled cylindrical shell. A thick walled top lid is typically welded to the top extremity of the shell after the used fuel is loaded in the canister leading to an all-welded confinement boundary. Thus, the so-called "high level waste," which includes used nuclear fuel, is confined in a space enclosed by a cylindrical canister consisting of a relatively thin wall shell welded to a thick baseplate and a thick top lid welded to its lower and upper extremity, respectively (see, e.g. FIG. 1A). The bottom and top enclosures are plate-type structures that must be sufficiently thick to withstand the design pressure applicable to the canister's role as a pressure vessel for forming an appropriate pressure retention boundary. The base plate and the top lid are typically in the range of about 3 to 9 inches thick, respectively (the top lid is usually much thicker than the base plate to limit the radiation dose to the lid welding crew). Sometimes, a narrow annular top closure ring is welded to the canister lid to protect vent and drain ports, as illustrated for example in FIG. 1B.

The welded canisters are generally stored inside ventilated outer modules called "casks" or "overpacks" which come in two known storage system variations: horizontal storage systems in which the canisters are stored horizontally (see, e.g. FIG. 2A) and vertical storage systems in which the canisters are stored vertically (see, e.g. FIG. 2B). The material of construction that is almost universally used in the nuclear waste material storage inner canister is classically austenitic stainless steel or one of its more recent adaptations known as Duplex stainless steel. Stainless steel is remarkably resistant to all types of corrosion except stress corrosion cracking (SCC), whose occurrence requires three parameters to be simultaneously present, namely a tensile stress field in the surface exposed to the environment, an adequate concentration of halides, and all accompanied by a high relative humidity in the ambient air. An adequate halide concentration level is typically present at storage facilities located at seasides which help trigger SCC. The threshold humidity level, typically considered to be 20%, is also present at coastal sites. Because the used fuel packaged in a canister is heat emitting (as much as 50 kilowatts, in some cases), most of the surface of the canister is heated which results in a concomitant reduction in the humidity of the air in contact with the external surface of the canister (as the air heats up, its relative humidity decreases). Thus, the portion of the canister surface vulnerable to SCC is the shell (the top and bottom plates are thick and therefore have a far larger reserve against thru-wall crack propagation). More specifically, the most vulnerable portion of the shell is the region that is not sufficiently hot and hence in contact with humid air. In vertical canisters, the bottom region or portion where the coldest air hits the canister in the ventilated cask/overpacks is most vulnerable to SCC.

As storage of the nuclear fuel in welded canisters for extended periods has increasingly become the most preferred approach in the U.S., UK, Spain and many other countries, the need to assure a long service life has become important. Peening the vulnerable surfaces to introduce a compressive stress state appears to be an effective means to eliminate one of the trio of SCC (tensile stress) inducing parameters. However, the results of this measure will not be known for a long time.

An improved nuclear waste material storage canister is desired.

SUMMARY

The present disclosure provides a nuclear waste material dry storage canister and system which employs a definitive long service life design comprising a prophylactically-protected canister shielding system to mitigate the adverse effects of stress corrosion cracking (SCC), thereby ensuring the long term integrity of the inner storage canister and boundary for containing radioactive contaminants. Different embodiments are disclosed providing varying levels of protection adapted for either horizontally or vertically stored canisters.

In one aspect, a canister for dry storage of nuclear waste material comprises: a tubular first shell defining an internal cavity for storing nuclear waste material; a lid sealably attached to a first end of the first shell; an end closure attached to a second end of the first shell, the first end closure comprising a base plate and an upturned annular closure flange disposed on a peripheral portion of the base plate; a circumferentially-extending butt joint formed between the annular closure flange and the second end of first shell; and a circumferentially-extending butt weld formed at the butt joint which hermetically seals the annular closure flange to the second end of the first shell.

In another aspect, a double-walled canister system for dry storage of nuclear waste material comprises a canister including: a tubular inner shell defining an internal cavity for storing nuclear waste material and having a first height; a first lid sealably welded to a first end of the inner shell; a primary base plate defining a peripheral edge portion and having an upturned annular closure flange disposed on the peripheral edge portion; and an annular full thickness butt weld formed at an abutment joint between the annular closure flange and second end of the inner shell which sealably attaches the first end closure to the inner shell. The inner shell, first lid, and first end closure collectively define a hermetically sealed primary pressure retention barrier. A tubular outer shell adjoins the inner shell, the outer shell having a second height which is at least coextensive with the first height of the inner shell; wherein the outer shell is welded to the canister to form a hermetically sealed secondary pressure retention barrier.

A method for fabricating a canister system for dry storage of nuclear waste materials is provided. The method comprises: providing a tubular first shell having a first end, a second end, and cavity extending between the first and second ends for storing nuclear waste materials, and a first base plate having an upturned annular flange defining a circumferential edge; abutting the circumferential edge of the annular flange against the first end of the first shell to form a butt joint; welding the circumferential edge to the first end of the first shell with a full thickness butt weld to form a hermetic seal; and welding an annular peripheral edge of a first lid to the second end of the first shell to form a hermetic seal.

BRIEF DESCRIPTION OF THE DRAWINGS

The features of the preferred embodiments will be described with reference to the following drawings where like elements are labeled similarly, and in which.

All drawings are schematic and not necessarily to scale. A reference herein to a figure number herein that may include multiple figures of the same number with different alphabetic suffixes shall be construed as a general reference to all those figures unless specifically noted otherwise.

DETAILED DESCRIPTION

Figure 1B:
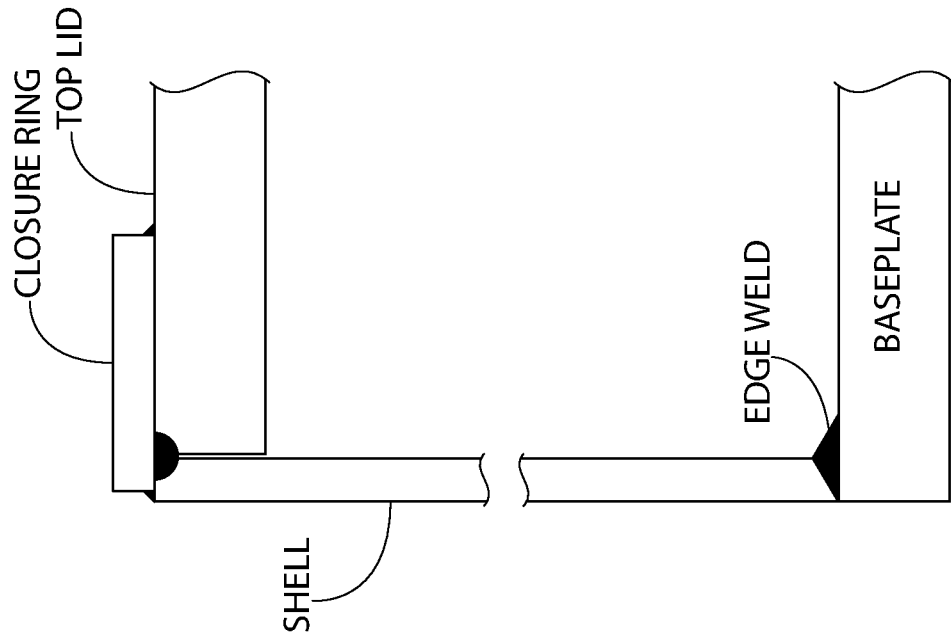
FIG. 1B is a view thereof showing an additional top partial closure ring.

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Figure 3:
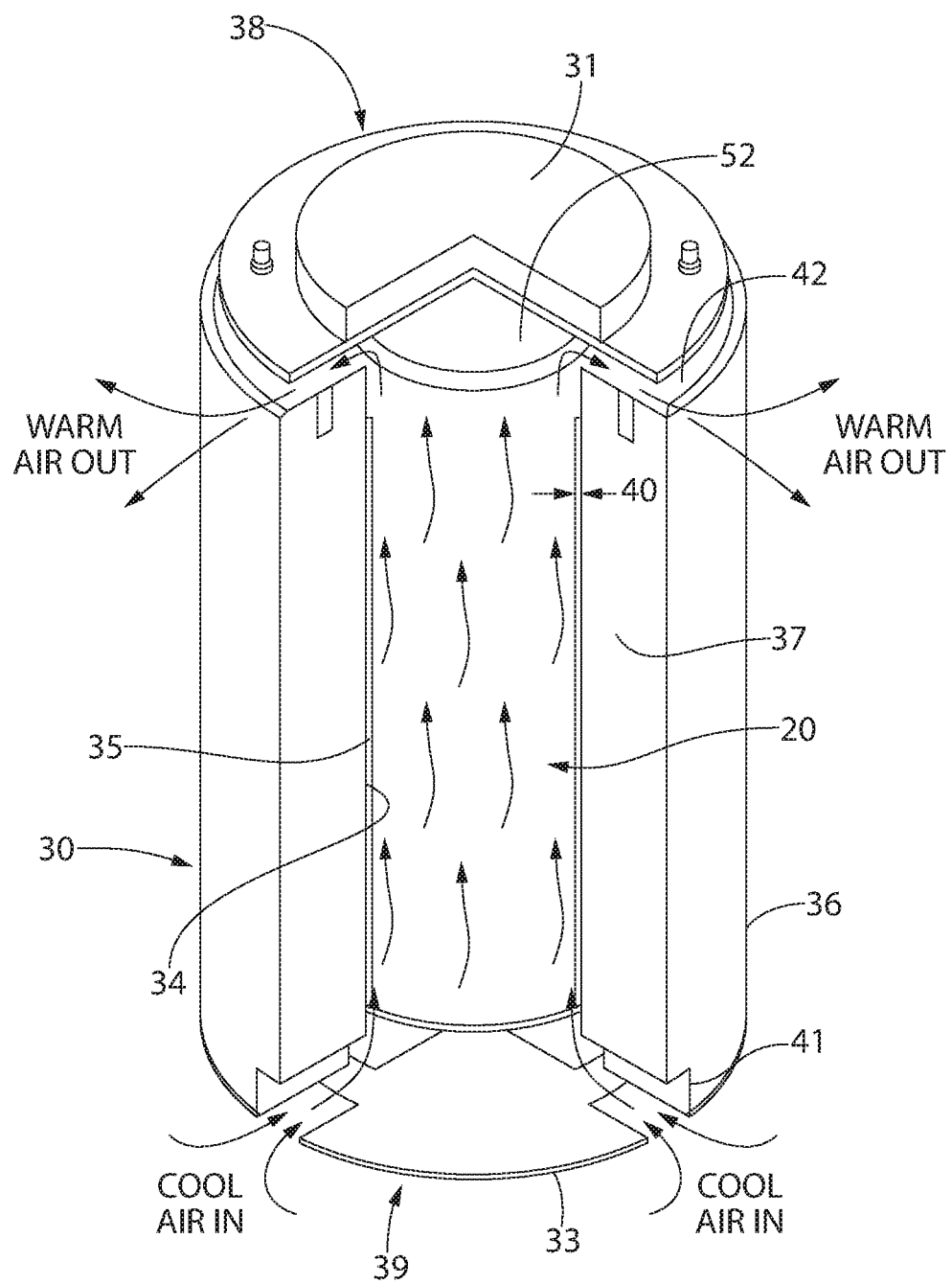
FIG. 3 is perspective view of a dry storage system according to the present disclosure comprising an inner canister for holding nuclear waste materials and an outer storage overpack or cask.

FIG. 3 shows a vertical dry storage system according to the present disclosure for long term storage of radioactive nuclear waste materials such as spent nuclear fuel (SNF) or other waste materials which may have been radioactively contaminated such as in a nuclear power generation facility.

The dry storage system comprises an inner canister 20 which is removably inserted inside an outer radioactively shielded storage overpack or cask 30. The cask and canister are configured for upright vertical storage of the nuclear waste materials.

The storage cask 30 is a heavy-walled steel and concrete cylindrical vessel having a composite construction comprising a cylindrical inner metal shell 35, a cylindrical outer metal shell 36, and a cylindrical intermediate concrete structure 37 disposed between the metal shells. A removable lid 31 closes the open top end 38 of the cask 30 and a bottom plate 33 closes the opposing open bottom end 39. The cask is a generally massive and heavy structure which absorbs the neutron and gamma fluxes emanating from the spent nuclear fuel (SNF) stored in the canister 20. Cask 30 defines an internal cavity 34 extending between opposing top and bottom ends 38, 39 of the inner shell 35 which is sized and configured to fit the canister 20 therein.

Preferably, an annular gap 40 is formed between the inner shells 35 and the canister 20 which provides a pathway for cooling air to flow upwards and remove heat generated from the radioactively decaying spent nuclear fuel inside the canister 20. One or more circumferentially spaced apart cooling air inlets 41 and cooling air outlets 42 are formed at the bottom and top ends 39, 38 of cask 30 which are in fluid communication with the annular gap 40. In operation, air in the annular gap 40 heated by the SNF inside canister 20 flows upwards via natural circulation between the canister 20 and cask 30. The heated cooling air is discharged radially and/or upwardly outwards from the upper portion of the gap through the air outlets 42, thereby drawing fresh ambient cool air radially and/or upwardly inwards through the air inlets 41 into the lower portion of the annular gap 40 (see directional cooling air flow arrows showing flow path).

Figure 4:
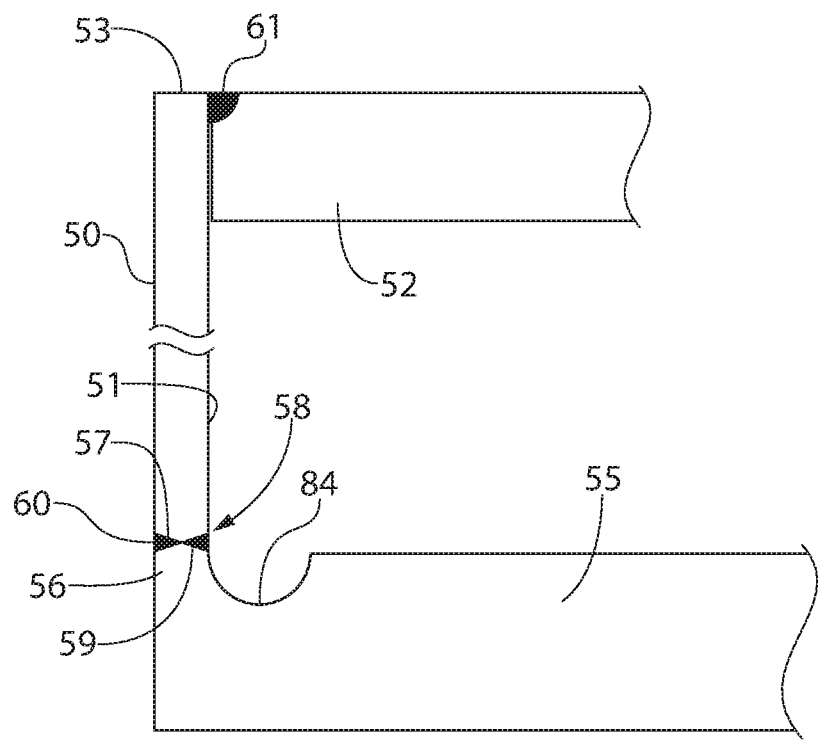
FIG. 4 is a partial side cross sectional view of welded joints in FIG. 3 between the shell of the canister and the base plate and top lid.
Figure 5:
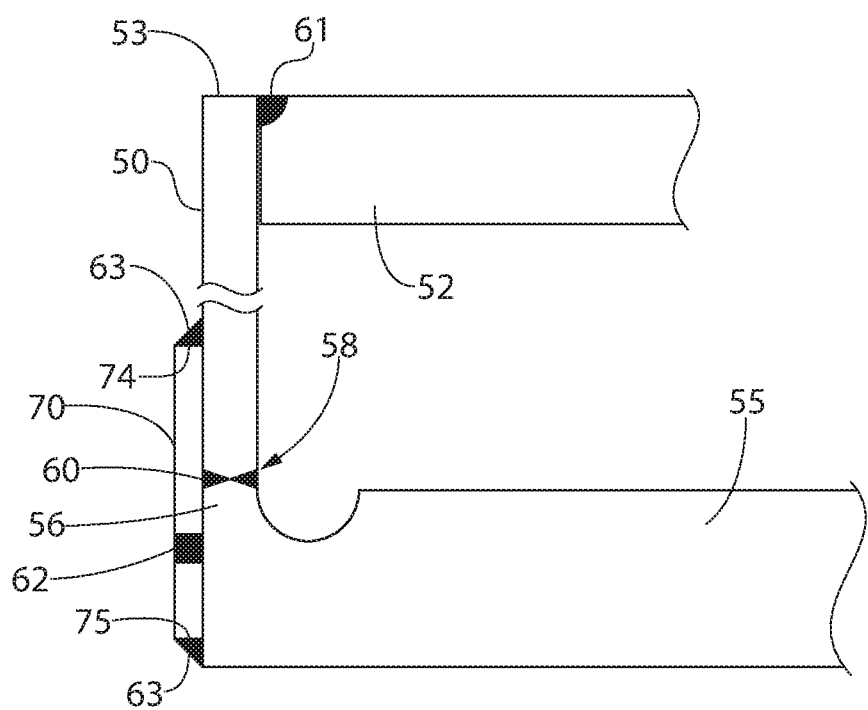
FIG. 5 is a side view thereof showing the addition of a partial secondary containment barrier in the form of an annular shell skirt.

Referring to FIGS. 3-5, canister 20 has an elongated cylindrical hollow body comprising a tubular shell 50 defining an internal cavity 51 for storing nuclear waste material. A SNF basket such as disclosed in U.S. Pat. No. 5,898,747 (incorporated herein by reference in its entirety) may be disposed in the cavity to facilitate storage of the used fuel rods. A top lid 52 is sealably attached to a top end 53 of the shell 50 and an end closure 54 is sealably attached to an opposing bottom end 57 of the shell. The lid and end closure preferably may be circular in shape to conform to the circular tubular shell. In some arrangements, the lid 52 may be partially or completely received into the cavity 51 through top end 53 of shell 50 as shown. The upwards facing top surface of the lid 52 may therefore be flush with the top end of the shell in one implementation as best shown in FIGS. 4 and 5, or in other configurations may recessed therein or extend partially above the top end of the shell. The canister 20 has a fully welded construction which hermetically seals the internal cavity 51 storing the spent nuclear fuel therein.

In one embodiment, the bottom end closure 54 of canister 20 comprises a primary base plate 55 and a peripheral upturned annular closure flange 56 disposed on the annular peripheral area or portion of the base plate. The annular edge 59 of the flange is horizontally orientated and defines an abutment edge 59 having an end surface which faces upwards for forming a butt joint with the downward facing end surface of the bottom end of canister shell 50, as further described herein. The edge 59 of flange 56 may be substantially flush with the top surface of the base plate 55 in some embodiments as illustrated in FIGS. 4 and 5 lying the same horizontal surface plane. However, in other possible embodiments the flange 56 may project upwards for a short distance beyond the horizontal plane defined by the top surface of the base plate 55. Flange 56 is preferably formed integrally with the base plate 55 as a unitary structural part thereof so that there is a single annular joint between the shell 50 and base plate. However, in other possible embodiments, the flange may be a separate component such as a ring welded to the base plate but with the same overall configurations as shown herein.

In one embodiment, the lid 52 and base plate 55 of canister 20 may preferably be substantially thicker than the shell 50 following standard construction approaches used to nuclear waste material dry storage canisters. The shell, lid, and bottom end closure of canister 20 are preferably made of a suitable corrosion resistant metal, such as without limitation stainless steel including ferritic, austenitic (e.g. 316L and 317L), and Duplex (e.g. Alloy S31803 and S32205) stainless steels. Duplex stainless is a dual-phase stainless steel with a grain structure that comprises both ferrite and austenite. Other suitable metallic materials including boron containing metals may be used for fabricating the SNF storage canisters.

Figure 1A:
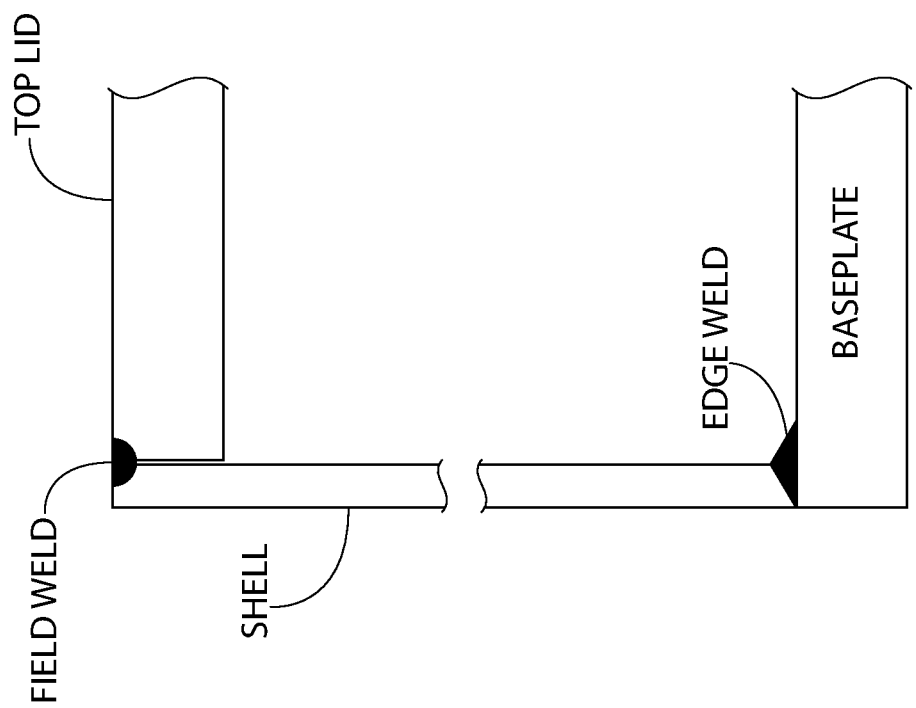
FIG. 1A is a cross sectional side view of a known nuclear waste material storage canister.

With continuing reference to FIGS. 3-5, a circumferentially-extending butt joint 58 may be formed between the horizontally oriented edge 59 of the peripheral annular closure flange 56 and the bottom end 57 of tubular shell 50. A circumferentially-extending butt weld 60 permanently hermetically seals and joins the bottom end closure 54 to the shell of canister 20. Advantageously, the standard corner joint configuration and partial thickness groove/edge welds used in prior canister shell/base plate junctions (see, e.g. FIG. 1A) are therefore replaced by the full thickness butt weld configuration which extends completely through the joint from interior to exterior as shown for example in FIGS. 4 and 5. The butt weld provides several benefits. First, the butt weld joint 58 facilitates improved non-destruction examination (NDE) testing of the shell/base plate joint by such techniques as radiography and ultrasonic (volumetric) as may be required by government regulatory agencies. The integrity of prior art edge welds due to their geometric configuration of such joints are less amenable to NDE techniques used to identify possible subsurface irregularities or inclusions such as radiography and ultrasonic testing. In addition, the butt weld joint disclosed herein also helps minimize the residual stresses trapped in the weld which can serve as nuclei for stress corrosion cracking (SCC) in certain ambient environments.

The butt joint 58 is preferably positioned proximate to base plate 55. In one embodiment, a circumferentially-extending upwardly concave surface depression 84 may be formed in the top surface of base plate 55 between the base plate and annular closure flange adjacent to the annular flange 56 and butt joint 58 to allow the joint to be located as close as possible to the top surface horizontal plane of the base plate as in the illustrated embodiment of FIGS. 4 and 5. The edge 59 of the annular flange and butt joint are therefore substantially flush in position with the top surface of the base plate 55. The depression 84 creates greater access to the interior side of the butt joint 58 to facilitate both forming the butt welded joint and subsequent NDE of weld in such a closely coupled arrangement. In other less preferred but still satisfactory embodiments, however, the annular closure flange 56 of bottom end closure 54 may protrude upwards for a short distance above the top surface of the base plate 55 (not shown) forming a sort of short vertical circular stub wall which is then butt welded to the bottom end shell 50. Either arrangement may be used.

The annular peripheral edge of the top lid 52 may be fully welded and hermetically sealed to the top end 53 of the canister shell 50 using any suitable type weld such as a groove weld 61. In one embodiment shown in FIGS. 4 and 5, the weld 61 which extends circumferentially around the entire top end of the canister may be a bevel groove weld as shown; however, other suitable types of groove or other welds may be used depending on the lid to canister interface configuration. It is well within the ambit of those skilled in the art to select an appropriate type of weld, weld filler material, and corresponding lid/shell edge profile as needed.

Because the lower portion of the canister 20 exposed to the colder air is the most susceptible location to stress corrosion cracking (SCC) as discussed above, the present disclosure provides several techniques for mitigating the initiation or propagation of this failure mechanism. In vertical dry storage systems, the bottom end region of the canister 20 is the problematic area for SCC since the coldest cooling air enters the outer overpack or cask 30 at this location (see, e.g. FIG. 3).

For vertical dry storage canisters 20, a double-walled/multi-walled canister construction may be used to combat SCC. The multi-wall canister, as the name implies, comprises designing the canister with two discrete sealed enclosures that are configured such that a thru-wall crack originating in one will not propagate into the other, thereby providing a redundant or back-up sealed shell to guard against possible radioactive contamination leakage from the canister. For this purpose, the two shells are preferably located intimately close to each other forming as extremely small interstitial space between them but are not physically bonded together by explosive or other techniques which would permit a crack originating in one shell to migrate into the next shell. As further described below, double wall shell construction geometry at various levels of enveloping the radioactive material confinement boundary are presented in the embodiments which follow.

Figure 2A:
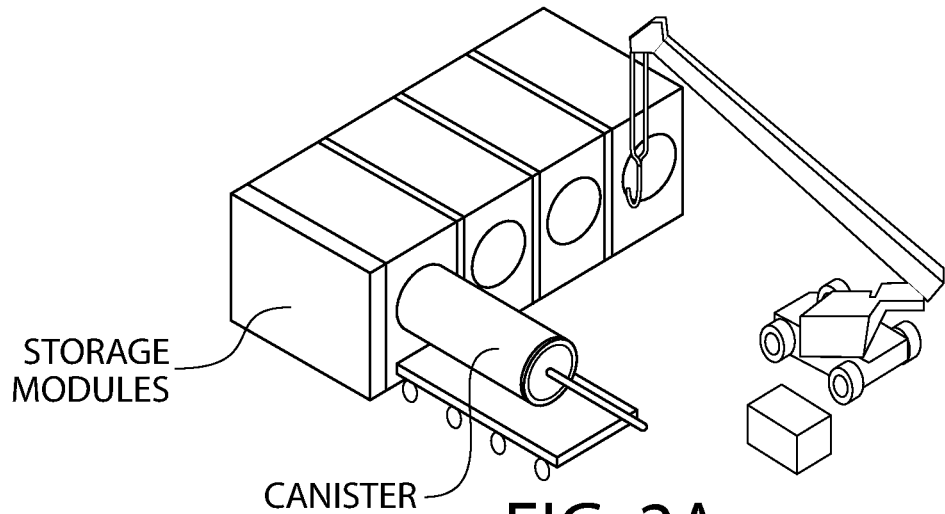
FIG. 2A is general schematic diagram of a exisiting horizontal dry storage system.
Figure 2B:
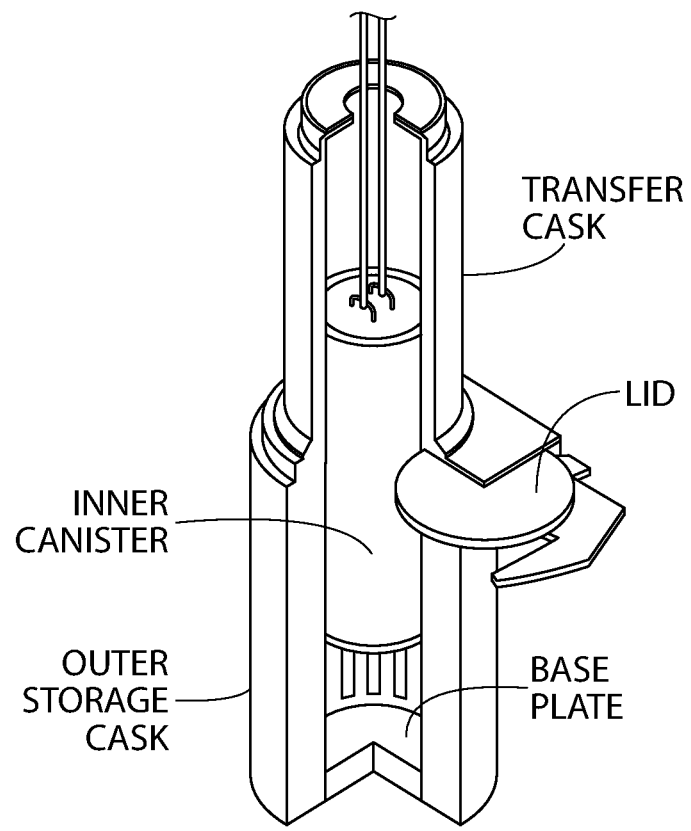
FIG. 2B is a general schematic diagram of a existing vertical dry storage system.

FIG. 5 depicts a first skirted multi-wall canister construction comprising partial double wall shell coverage for a vertical dry storage canister 20 usable in the vertical dry storage system shown in FIG. 2B above. In this embodiment, a partial annular second outer shell skirt 70 envelopes only a lower region or portion of the inner shell 50 to target the coldest area of the canister 20 as a final containment barrier. Skirt 70 extends around the full circumference of the shell 50. Preferably, the skirt 70 has a height less than the full height of the inner shell 50, and more preferably less than or equal to half the full height of the inner shell. The skirt 70 has an arcuate concave shape which conforms to the diameter and geometry of the inner canister shell 50. In one embodiment, a plurality of welds are used to hermetically seal the outer shell skirt 70 to the lower portion of the inner shell 50. This may include a plurality of circumferentially spaced apart plug welds 62 formed around the skirt to secure it preferably to the base plate 55 of the canister 20 which has a greater material thickness than the inner shell providing a more robust connection. The annular-shaped top end 74 of the shell skirt 70 may be sealed to the inner shell 50 via a full circumferential fillet weld 63. The annular-shaped bottom end 75 of the skirt may be sealed to base plate 55 via another full circumferential fillet weld 63. Other types of welds may be used in other embodiments. The outer shell skirt 70 is hermetically sealed to the inner shell 50 to form a secondary pressure retention boundary corresponding to the extent of the inner shell covered by the skirt.

Figure 10:
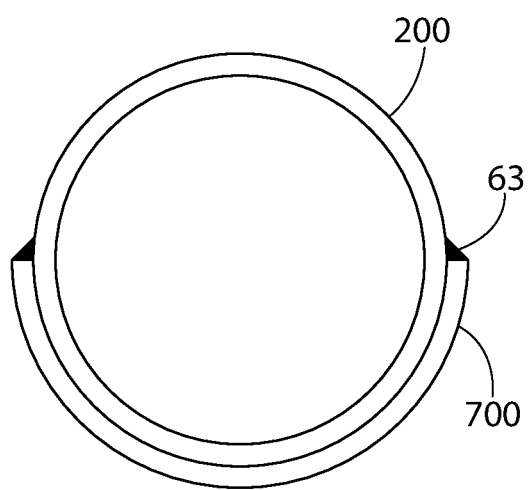
FIG. 10 is an end view of a horizontal canister having a partial shell skirt on a lower portion of the canister shell.

FIG. 10 shows a partial coverage shell skirt 700 adapted for a horizontal dry storage canister 200 such as those used in the horizontal dry nuclear waste material storage system shown in FIG. 2A above. The skirt 700 has a concave shape which conforms to the diameter and geometry of the storage canister shell. The skirt 700 has a circumferential extent less than the fully circumference of the inner shell 50 and preferably a length at least coextensive with the length of the inner shell. In one embodiment, the skirt 700 may cover the entire lower half of the canister 200 as shown, or in other embodiments a greater or less circumferential extend of the canister shell. Fillet welds 63 or other suitable welds may be used to hermetically seal the outer shell skirt 700 to the canister 200.

Figure 6:
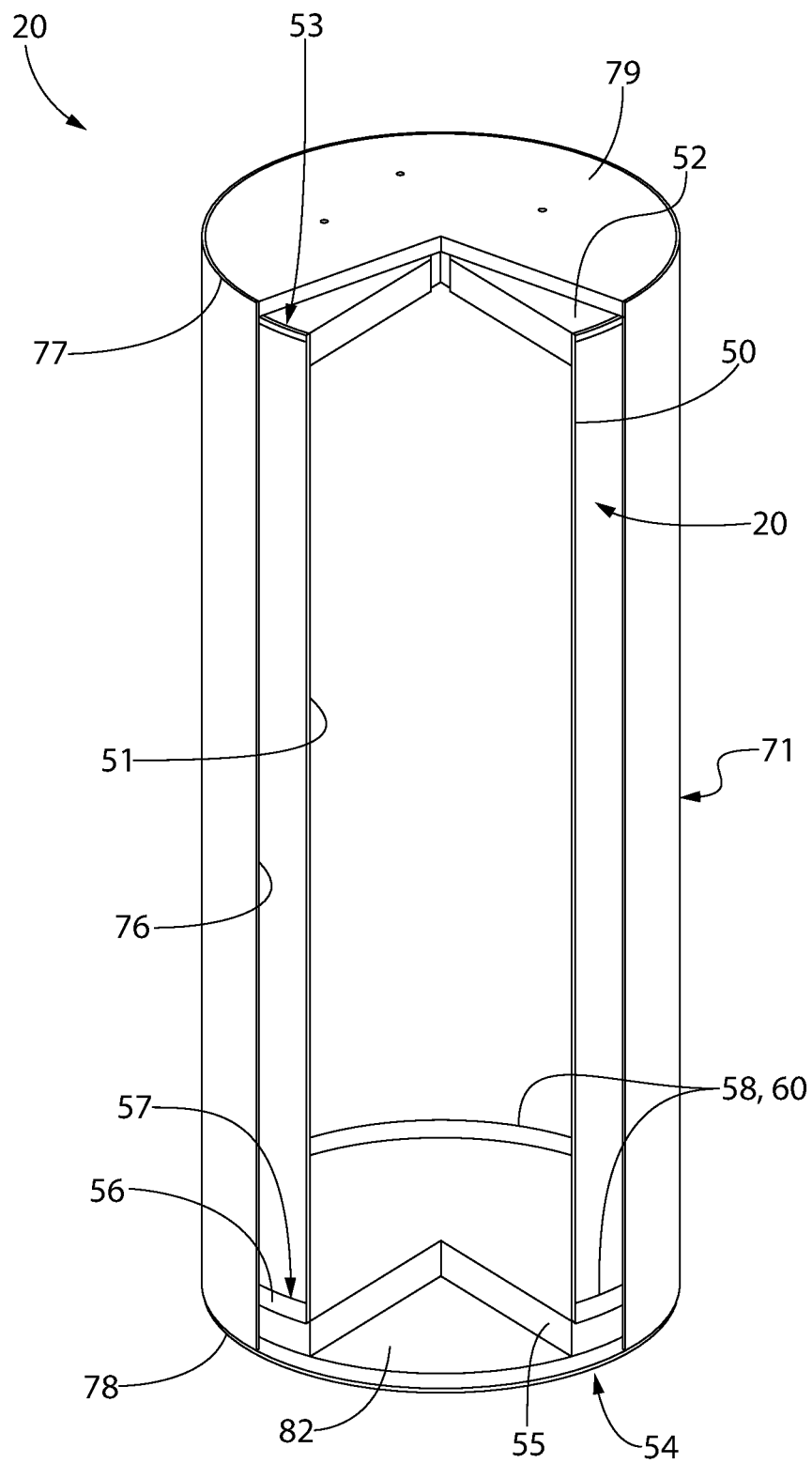
FIG. 6 is a perspective breakaway view of a double-walled canister system comprising an inner canister and outer shell assembly forming a full coverage secondary containment barrier encapsulating the inner canister.
Figure 7:
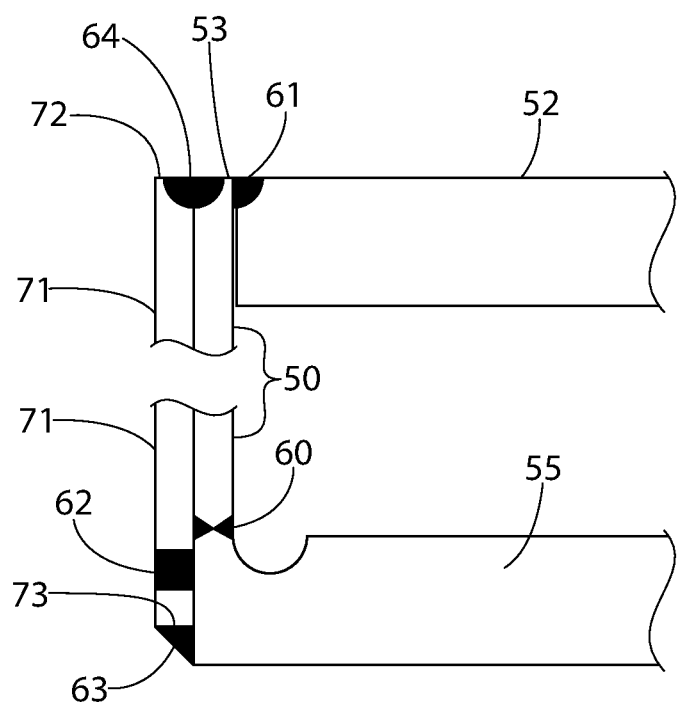
FIG. 7 is a partial side cross sectional view of welded joints used in a canister system having a double-walled shell and single top lid.
Figure 8:
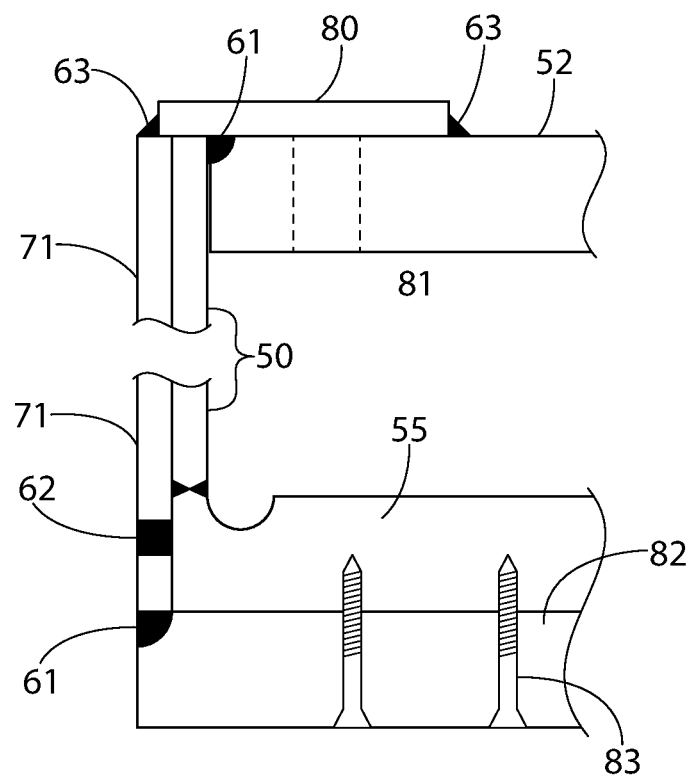
FIG. 8 is a partial side cross sectional view of FIG. 7 showing the addition of a secondary base plate, optional partial closure ring on top, and optional stay fastener supporting the second base plate.

FIGS. 6-9 depict examples of a more complete coverage multi-wall canister construction each commonly comprising a complete double wall shell system as a starting point. In the embodiment of FIGS. 7-8, a tubular second outer shell 71 adjoins and envelopes the entire inner shell 50 for at least the full height of the inner shell 50 extending from at least the top end 53 to bottom end 57 of the inner shell. The outer shell 71 defines an internal cavity 76 configured and dimensioned to hold inner shell 50. Outer shell 71 is preferably in very close proximity to the inner shell 50 as much as practicable to minimize the size of any annular interstitial space formed therebetween to minimize the amount of air trapped therein which may be evacuated and filled with an inert gas.

Outer shell 71 has a greater height than the inner shell 50 in one embodiment such that the lower end of the outer shell extends below the lower end of the inner shell for welding to the base plate 55 of the inner shell. The top ends of the inner and outer shells 50, 71 may be at the same elevation or height as shown. The annular-shaped top end of the outer shell 71 may be sealed to the inner shell 50 via a full circumferential groove weld 64 between the top ends 72, 53 of the outer and inner shells respectively. The annular-shaped bottom end 73 of the outer shell 71 may be sealed to base plate 55 via the same plug welds 62 and full circumferential fillet welds 63 described above (see, e.g. FIG. 7). Other types of welds may be used in other embodiments. The outer shell 71 is hermetically sealed to the inner shell 50 to form a secondary pressure retention boundary corresponding to the full extent of the inner shell 50 covered.

Full shell and base plate coverage may be provided in an alternative embodiment of a multi-wall canister 20 as shown in FIGS. 7 and 8. In this configuration, the primary base plate 55 welded to primary inner shell 50 may be covered/enclosed and protected by a secondary base plate 82 welded to the secondary outer shell 71. This embodiment includes a single primary top lid 52. Optionally, the top lid 52 may also include annular closure ring 80 as already described above. The outer secondary base plate 82 adjoins and completely covers the downward facing bottom surface of the inner primary base plate 55 being in very close proximity thereto. The interstitial space between the inner and outer boundaries of the shells 50, 71 and base plates 55, 82 may be evacuated and filled with an inert gas (e.g. helium or nitrogen). The outer shell 71 may be hermetically sealed to the secondary base plate 82 by a circumferentially-extending suitable weld such as a groove weld 61. In this embodiment, the bottom end 73 of outer shell 71 may be coextensive with the bottom surface of the inner base plate 55 as shown in FIG. 8.

In the embodiment of FIG. 8, an annular top closure ring 80 may optionally be welded to the top lid 52 and top ends 72, 53 of the inner and outer shells 50, 71 respectively. Any suitable type of weld may be provided. In one embodiment, a full circumferential fillet weld 63 may be provided on the inner and outer sides of the closure ring 80 to hermetically seal the ring to the canister 20. The ring 80 preferably has a sufficient width to cover and closes all through-ports 81 or other apertures that extend completely through the lid into the cavity 51 of the canister which may be used to evacuate air from and dry the interior of the canister during the canister drying process described above.

In some embodiments, the secondary base plate 82 may optionally be buttressed by a plurality of stay fasteners 83 of any suitable type, as shown in FIG. 8. Fasteners 83 extend completely through the outer base plate 82 and only partially into the inner base plate 55 to a depth which provides sufficient purchase to secure the fasteners in thereto. In one embodiment, threaded fasteners such as bolts or screw may be used to reinforce the attachment between the inner and outer base plates 55, 82. The stay fasteners may be necessary if the secondary base plate 82 and its junction with the outer shell 71 are not structurally sufficient to withstand the internal pressure under the hypothetical scenario in which the inner confinement shell is assumed to have developed a through leak. This forms a secondary or backup pressure retention barrier.

Figure 9:
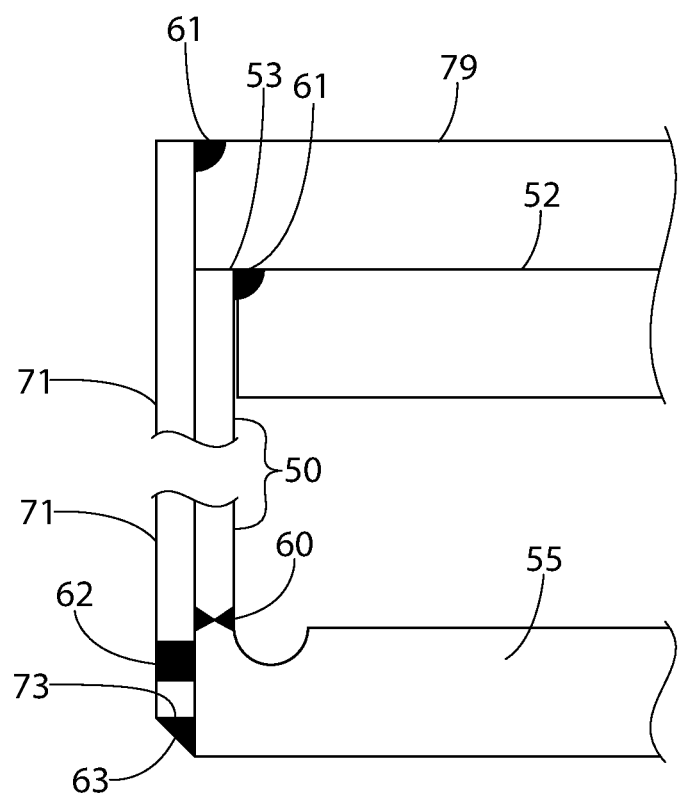
FIG. 9 is a partial side cross sectional view of welded joints used in the canister system of FIG. 6 having a double-walled shell and secondary top lid.

In an alternative embodiment and variation of the multi-wall (double shell) canister construction shown in FIGS. 6 and 9, complete top, bottom, and side confinement boundary coverage may be provided for the inner shell, its base plate, and its bottom closure assembly. This configuration envisages surrounding the entire primary confinement boundary of canister 20 formed by inner shell 50 by a complete secondary confinement boundary. An outer secondary top lid 79 is sealably welded along its peripheral edge to the top end 77 of the outer shell 71, which thereby fully covers and encloses the top lid 52 on the inner shell 50. A full circumferential groove weld 61 may be used to seal the lid 79 to the shell 71 (see, e.g. FIG. 9). The top lid 79 is preferably in close proximity to the top lid 52. In this construction, the outer shell 71 extends above the top end 53 of the inner shell 50 (see, e.g. FIG. 6) in contrast to the arrangement without a secondary top lid 79 in which the ends of the inner and outer shells are flush with each other (see, e.g. FIGS. 7 and 8). The primary base plate 55 at the bottom end of the inner shell 50 is already covered and enclosed by the secondary base plate 82 as described herein.

As a further defense-in-depth measure, the interstitial space between the two walls of the inner and outer shells 50, 71 in the foregoing multi-wall constructions may be evacuated and filled with an inert gas such as without limitation helium or nitrogen. It also bears noting that whether a partial or full outer shell is provided for a multi-wall canister 20, the cavity 34 of the outer storage cask 30 is still sized to insert and accommodate the canister therein in a manner which maintains the annular gap 40 between the canister and cask for natural convective cooling.

It will be appreciated that any of the foregoing double-walled or skirted canister assembles may be stored in the overpack or cask 30 shown in FIG. 3 by sizing the cavity 34 appropriately to accommodate the larger diameter portions of the double-walled or skirted canisters. It will also be appreciated that all welds disclose herein with the exception of plug welds 62 are full circumferential welds extending completely around the canister and its shell, lids, or base plates as applicable to form a fully hermetically sealed pressure boundaries.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A canister for dry storage of nuclear waste material, the canister comprising:
   a steel tubular first shell defining an internal cavity for storing nuclear waste material;
   a lid sealably attached to a first end of the first shell;
   an end closure attached to a second end of the first shell, the end closure comprising a steel base plate and an upturned annular closure flange disposed on a peripheral portion of the base plate;
   a circumferentially-extending butt joint formed between the annular closure flange and the second end of first shell;
   a circumferentially-extending butt weld formed at the butt joint which hermetically seals the annular closure flange to the second end of the first shell;
   a steel annular shell skirt adjoined and welded to a lower portion of the first shell proximate to its second end, the shell skirt extending circumferentially around the lower portion and having a height less than a full height of the first shell, wherein the shell skirt forms a hermetically sealed secondary pressure retention barrier over the butt weld; and
   a plurality of circumferentially spaced apart plug welds which secure the annular shell skirt directly to the base plate.

2. The canister according to claim 1, wherein the annular closure flange has an edge which is horizontally oriented at the butt joint to mate with the second end of the first shell.

3. The canister according to claim 1, wherein the lid is hermetically sealed to the first end of the first shell by a welded annular joint.

4. The canister according to claim 3, further comprising an annular closure ring welded to the lid and first end of the first shell which covers the welded joint of the lid.

5. The canister according to claim 1, wherein the annular closure flange is formed integrally with the first base plate as a unitary structural part thereof.

6. The canister according to claim 1, further comprising an annular concave surface depression formed in a top surface of the base plate adjacent the annular flange and butt joint.

7. The canister according to claim 1, wherein the first shell has a vertical orientation.

8. The canister according to claim 1, wherein the shell skirt covers the butt joint and is in direct contact with the butt weld.

9. The canister according to claim 1, wherein the first shell, annular shell skirt, base plate, and lid are formed of stainless steel.

10. The canister according to claim 1, wherein the annular shell skirt and first shell are each formed of a stainless steel which is compatible for welding the annular shell skirt to the first shell.

11. The canister according to claim 1, wherein the annular shell skirt comprises a top end welded to the first shell by a circumferential top weld, and a bottom end welded to the base plate by a circumferential bottom weld.

12. The canister according to claim 11, wherein the bottom end of the annular shell skirt is welded to a peripheral side of the base plate by the circumferential bottom weld.

13. The canister according to claim 11, wherein the circumferential top and bottom welds are each fillet welds.

14. The canister according to claim 1, wherein each plug weld extends completely through the annular shell skirt in a radial direction from an exterior surface of the skirt to the base plate.

15. The canister according to claim 1, wherein the annular shell skirt has a height less than half the full height of the first shell.

* * * * *